(12) United States Patent
Glebov et al.

(10) Patent No.: US 7,418,165 B2
(45) Date of Patent: Aug. 26, 2008

(54) FLEXIBLE OPTICAL WAVEGUIDES FOR BACKPLANE OPTICAL INTERCONNECTIONS

(75) Inventors: Alexei Glebov, San Mateo, CA (US); Kishio Yokouchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/274,225

(22) Filed: Nov. 15, 2005

(65) Prior Publication Data

US 2006/0126995 A1 Jun. 15, 2006

Related U.S. Application Data (62) Division of application No. 10/799,026, filed on Mar. 12, 2004, now Pat. No. 6,996,303.

(51) Int. Cl.
*G02B 6/12* (2006.01)
*G02B 6/26* (2006.01)
*G02B 6/10* (2006.01)

(52) U.S. Cl. .............................. 385/14; 385/47; 385/130

(58) Field of Classification Search ................... 385/14, 385/47, 130
See application file for complete search history.

(56) References Cited

U.S. PATENT DOCUMENTS

| | | | |
|---|---|---|---|
| 5,263,111 A * | 11/1993 | Nurse et al. .................. 385/130 |
| 5,761,350 A * | 6/1998 | Koh .............................. 385/14 |
| 6,208,791 B1 * | 3/2001 | Bischel et al. ............... 385/129 |
| 6,539,143 B1 * | 3/2003 | Hunter .......................... 385/19 |
| 6,556,734 B1 * | 4/2003 | Bischel et al. ................. 385/14 |
| 6,684,007 B2 * | 1/2004 | Yoshimura et al. ............. 385/31 |
| 6,690,845 B1 * | 2/2004 | Yoshimura et al. ............. 385/14 |
| 6,706,546 B2 * | 3/2004 | Yoshimura et al. ............. 438/31 |
| 6,785,447 B2 * | 8/2004 | Yoshimura et al. ............. 385/42 |
| 7,016,569 B2 * | 3/2006 | Mule et al. ..................... 385/37 |
| 7,139,448 B2 * | 11/2006 | Jain et al. ...................... 385/14 |
| 2002/0097962 A1 * | 7/2002 | Yoshimura et al. ............. 385/50 |
| 2004/0071387 A1 * | 4/2004 | Mule et al. ..................... 385/14 |
| 2005/0111781 A1 * | 5/2005 | Jain et al. ...................... 385/15 |

* cited by examiner

*Primary Examiner*—Kianni C Kaveh
(74) *Attorney, Agent, or Firm*—Baker Botts L.L.P.

(57) ABSTRACT

A flexible optical connector suitable for use in an optical backplane for interconnecting optical circuit boards, and methods of making the optical connector, are disclosed. The flexible optical connector comprises a plurality of waveguides on two or more levels providing a plurality of light paths that allow light communication between optical circuit boards. The optical connector can be manufactured separately from the backplane and thereafter mounted on the backplane. The backplane of the present invention may also have a mounting structure for removably retaining and positioning optical circuit board and may, optionally, include electrical traces for providing electrical interconnections between the circuit boards.

6 Claims, 7 Drawing Sheets

FLEXIBLE OPTICAL WAVEGUIDES FOR BACKPLANE OPTICAL INTERCONNECTIONS

CROSS-REFERENCE TO RELATED APPLICATION

This application claims priority as a division of allowed U.S. patent application Ser. No. 10/799,026 filed Mar. 12, 2004, now U.S. Pat. No. 6,996,303 published Sep. 15, 2005, (Pub. No. US 2005/0201707), the entire disclosure of which is incorporated by reference.

FIELD OF THE INVENTION

This invention is related to connecting optical devices. In particular, the present invention is directed to a flexible optical connector, and methods of manufacturing a flexible optical connector, the optical connector being particularly useful for interconnecting optical circuit boards on an optical backplane.

BACKGROUND OF THE INVENTION

The growth of networks capable of handling high data-rate transfer of voice and data has increased the demand and performance requirements for optical networks. While information can be transferred optically over large distances, there is generally a need for changing optical signals to electrical signals and vice versa, requiring structures and devices for interfacing the optical components with electrical and electro-optical components. Thus for example, optical networks include amplifiers for strengthening optical beams, switches for routing signals, and converters for transducing, as necessary, electrical and optical signals at either end of the network. These functions are performed by devices that include optical, electro-optical and electrical components.

It is advantageous to use a common backplane to interconnect optical and electro-optical components on two or more circuit boards. Such circuit boards may be designed for optical communications via the edge of the boards and may, therefore, include one or more edge-mounted electro-optic devices or edge-terminating optical waveguides. Examples of optical circuit boards are described in co-owned U.S. Pat. No. 6,611,635 to Yoshimura et al., incorporated herein by reference. One requirement of a backplane for optical interconnecting between optical circuit boards is the need to provide for complex signal routing.

SUMMARY OF THE INVENTION

The present invention provides optical interconnect structures and methods for providing optical interconnections between optical circuit boards.

In one aspect, the present invention comprises a flexible optical connector suitable for use as an optical backplane for communicating optical signals between a plurality of optical circuit boards. The optical connector includes a flexible strip having a plurality of waveguides formed in a plurality of waveguide layers for providing a plurality of optical paths between opposing ends of the flexible strip, where at least one of the optical paths runs through at least two of the waveguide layers. The optical paths may include input and output ports near the ends of the flexible strip. The flexible strip may include at least one pass-through structure for routing light between layers. The pass-through structure, or optical via, may be used to cause the optical paths in the flexible strip to cross over, enabling complex routing of optical signals between the optical circuit boards. The pass-through structure may comprise a complementary pair of reflective angled surfaces, and the overall thickness of the strip is, preferably, between about 50 to about 1,000 μm.

The inventive flexible strip may be mounted on a backplane substrate to couple a plurality of optical circuit boards removably retained and positioned on the backplane by a mounting structure, such as brackets. The backplane may also provide electrical traces for providing electrical interconnections between the circuit boards.

In another aspect, the present invention comprises an optical backplane for communicating optical signals between a plurality of optical circuit boards and optically connect one or more optically active areas of the optical circuit boards. The optical backplane includes a substrate, mounting structures, such as brackets, for retaining the optical circuit boards, and a plurality of waveguides mounted on the substrate having waveguide ends adjacent to the optical circuit boards. The waveguides are preferably formed in a flexible strip that includes a plurality of waveguide layers and a cladding layer separating adjoining ones of the plurality of waveguide layers.

A further aspect of the present invention comprises a method of forming an optical backplane to optically connect an optical circuit board having an edge comprising two or more optically active areas. The method includes forming a flexible strip comprising at least two waveguide layers and having a plurality of waveguides formed therein, said waveguides having waveguide ends, mounting the flexible strip on a substrate, and providing a mounting structure for retaining optical circuit boards on the backplane adjacent to said waveguide ends.

In one embodiment, the flexible strip is fabricated by forming a sacrificial layer on a temporary substrate, depositing a first cladding layer on the sacrificial layer, depositing a first core layer on said cladding layer, forming a first core pattern from said core layer, depositing a second cladding layer over the first core pattern and exposed portions of the first cladding, removing the sacrificial layer and temporary substrate, depositing a second core layer and forming a second core pattern from said second core layer on the first cladding layer opposite the first core pattern, and depositing a third cladding layer on the formed second core pattern and exposed portions of the first cladding.

In another embodiment, the forming of the flexible strip includes forming a bottom waveguide layer including a bottom cladding layer, forming a top waveguide layer including a top cladding layer, and joining the top cladding layer to the bottom cladding layer.

An object of the present invention is to provide an flexible optical connector which may be used in an optical backplane, and a method of forming an optical backplane that are less expensive that prior art optical backplanes and methods of fabricating optical backplanes.

Another object of the present invention to provide an optical backplane that is manufactured separately from either a support substrate or from circuit board brackets.

A further object of the present invention to provide an optical backplane that allows for electrical and optical connections along the same edge of an optical circuit board.

Yet another aspect of the present invention to provide a waveguide structure that is attached to form an optical backplane at the ends of the waveguide.

These features, together with the various ancillary provisions and features which will become apparent to those skilled in the art from the following detailed description, are attained by the flexible optical backplane and method of the present invention, preferred embodiments thereof being shown with reference to the accompanying drawings, by way of example only.

BRIEF DESCRIPTION OF DRAWINGS

The foregoing aspects and the attendant advantages of this invention will become more readily apparent by reference to the following detailed description when taken in conjunction with the accompanying drawings wherein.

Reference symbols are used in the Figures to indicate certain components, aspects or features shown therein, with reference symbols common to more than one Figure indicating like components, aspects or features shown therein.

DETAILED DESCRIPTION

The present invention is directed to flexible optical interconnect structures, and methods of manufacture, which are for particularly suitable for connecting optical circuit boards on a common optical backplane. The transition from electrical to optical interconnection of high speed electronic devices is inevitable with the increased operational frequencies of integrated circuits ("ICs") and other circuit structures. Unlike electrical interconnect structures, optical interconnect structures are free of capacitive loading and do not suffer from cross-coupling between channels. Optical interconnects are, therefore, much faster than electrical connection, and allow reduced pitch between adjacent signal channels.

Figure 1A:
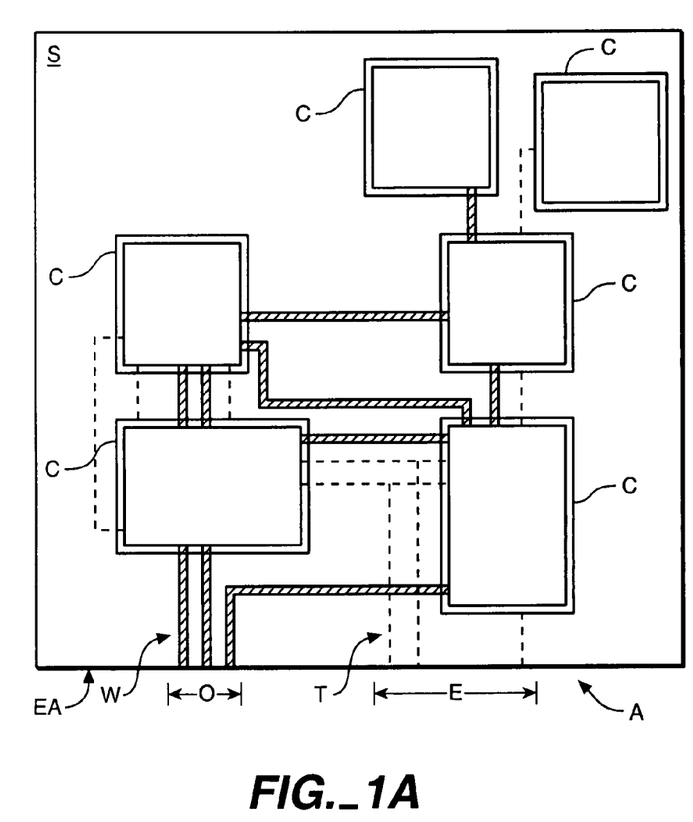
FIGS. 1A and 1B depict exemplary optical circuit boards for use with the optical backplane of the present invention.
Figure 1B:
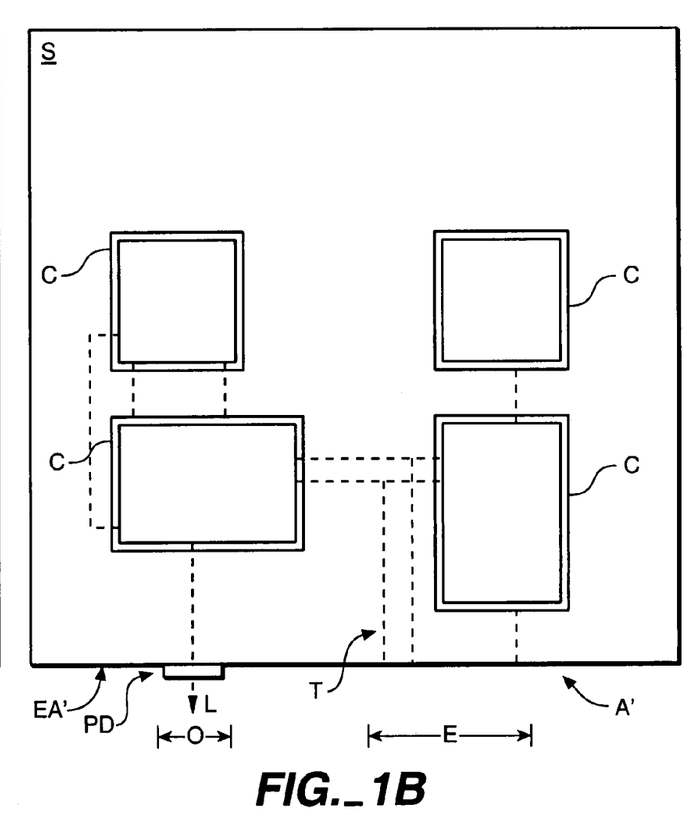

Exemplary optical circuit boards A, which can be connected to the optical backplane of the present invention, are shown in FIGS. 1A and 1B. FIG. 1A shows a first exemplary optical circuit board A which includes several components C, such as IC "chips" that incorporate one or more optical, electronic and electro-optical components, such as semiconductor lasers, such as Vertical Cavity Surface Emitting Lasers (VCSEL) and edge emitting lasers, photodiodes (PD), traditional electronic circuitry or other optical or electronic components. In one aspect, the present invention is directed to backplane for accepting optical circuit boards, such as board A, to provide power to the board and to route electrical and optical signals between such boards, and other components.

Exemplary optical circuit board A (alternatively referred to herein as "circuit board" or "board") is layered, and includes one or more layers having conductive traces T for routing electronic signals and one or more layers having waveguides W for routing optical signals. Some of traces T and waveguides W are patterned to route signals between components C and others are patterned to terminate at an edge EA to allow for electrical and optical connections to other boards or devices. As shown in FIG. 1A, traces T terminate within a region E of edge EA, and waveguides W terminate within a region O of the edge.

Exemplary optical circuit board A' of FIG. 1B is generally similar to optical circuit board A of FIG. 1A, but contains only electrical wiring. In FIG. 1B edge EA' comprises an edge-mounted electro-optic device, such as an LED or a laser, that projects light L in the direction of region O, adjacent to the edge of the board.

Figure 2:
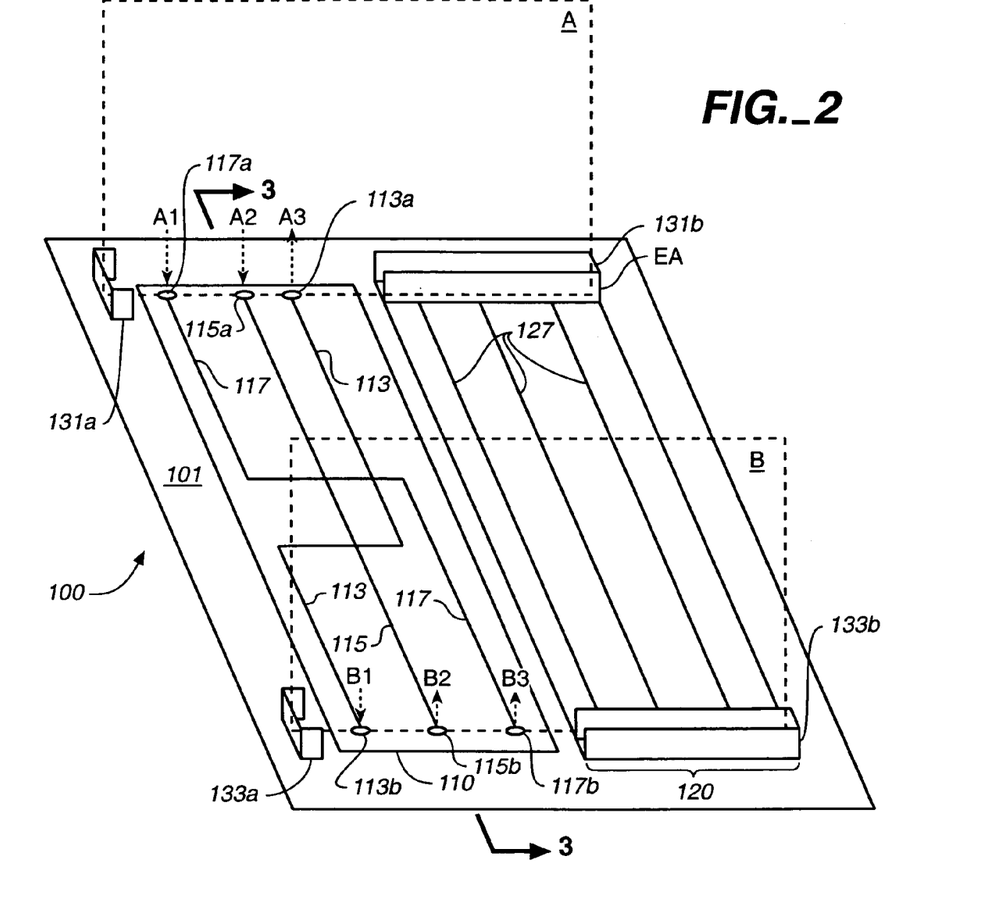
FIG. 2 is a perspective view of an embodiment of an optical interconnect of the present invention used as an optical backplane, showing optical and electrical connections on a backplane.
Figure 3:
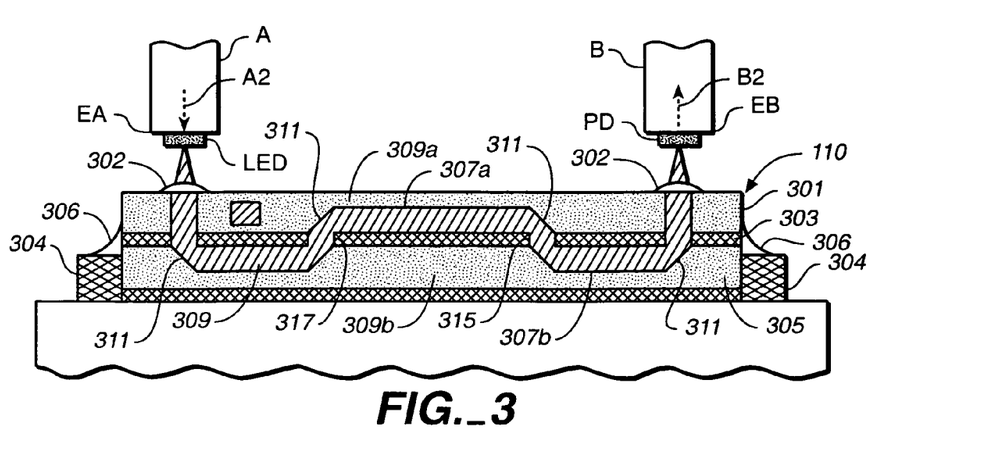
FIG. 3 is a cross-sectional of the optical backplane of FIG. 2 along view lines 3-3.

An exemplary embodiment of one aspect of the present invention is shown in FIGS. 2 and 3. FIG. 2 shows a backplane 100 comprising a substrate 101 with an optical backplane 110 and an electrical backplane 120 mounted or formed thereon. FIG. 3 is a cross-sectional view of the backplane 100 of FIG. 2 along view lines 3-3. As shown in FIG. 3, in one embodiment, optical backplane 110 may be positioned on substrate 101 by alignment standoffs 304 and secured with adhesive 306. Optical backplane 110 includes waveguides 113, 115, and 117, and electrical backplane 120 includes electrical traces 127. Exemplary backplane 100 has one or more mounting structures for retaining circuit boards in a position that allows for the exchange of electrical and optical signals between the circuit boards and backplane 100. In FIG. 2, the mounting structure comprises two sets of bracket pairs 131a, 131b and 133a, 133b. Bracket pairs 131, 133 include electrical connector brackets 131b, 133b and optical connector brackets 131a, 133b. Preferably, the mounting structure permits removal of the circuit boards without damage to either the circuit boards or to the substrate. While the embodiment of FIG. 2 has brackets for receiving two circuit boards, those skilled in the art will appreciate that the mounting structure can be constructed to retain more than two circuit boards on the backplane. Likewise, while the exemplary mounting structure comprises bracket pairs, other structures may be used to position and removably retain circuit boards on the backplane. Moreover, the circuit boards and backplane may be configured so that only optical connections are made on the backplane.

In the exemplary embodiment of FIGS. 2 and 3, one or more photonic devices, such as lasers or light emitting diodes LEDs for transmitting light or photodiodes PDs for receiving light are mounted on the edges of optical circuit boards A and B. Alternatively, the board edges may have waveguide ends which transmit light to or from semiconductor lasers, LEDs, PDs, or other photonic devices mounted on or formed within the circuit boards. In either case, when the boards are mounted on the backplane, the photonic devices or the waveguide ends are positioned adjacent to waveguide ends on optical substrate 110 such that optical signals may be transmitted therebetween.

Electrical connector brackets 131b and 133b provide contact between electrical traces on the optical circuit boards and electrical traces 127 of electrical backplane 120. Suitable structures for providing electrical contact are well known and need not be described in detail.

As noted, optical backplane 110 comprises a plurality of waveguides that have ends adjacent to the optical circuit boards for making optical connections therebetween. Thus, for example, waveguides 113, 115, and 117, each have one end near optical circuit board A and another end near optical circuit board B, to provide a plurality of optical paths for interconnecting the optical circuit boards. For simplicity, only three such optical paths are shown. Preferably, optical backplane 110 is flexible, with the optical layers formed from optical polymers, and is attached to substrate 101.

As an illustrative example of the three-dimensional routing of light through optical backplane 110, waveguides 113, 115, and 117, defining three light paths, are shown as having waveguide ends 113A, 115A, and 117A, respectively, adjacent to an edge of optical circuit board A, and waveguide ends 113B, 115B, and 117B, respectively, adjacent to an edge of optical circuit board B, to provide transmission of optical signals between the optical circuit boards. For exemplary purposes, the direction of propagation of optical signals to and from optical circuit board A are shown as rays A1, A2, and A3, and those to and from optical circuit board B are shown as rays B1, B2, and B3. Each waveguide end preferably includes a lens for focusing the light entering or leaving the optical backplane. Thus, for example, in the embodiment shown in FIG. 3, a lens 302 is positioned at each waveguide end, 113A, 113B. The ends of the waveguides in optical substrate 110 serve as the input and output ports of the waveguides. While lenses 302 are shown positioned at the waveguide ends in FIG. 3, in other embodiments lens may be positioned anywhere between the waveguide end and the light transmitter or receiver.

As depicted in FIG. 3, the optical connector of the present invention contains a plurality of waveguide layers such that the optical signals may cross within the backplane. This allows complex signal routing between any two points on optical circuit board A and optical circuit board B.

Propagation of light through optical backplane 110 is illustrated in FIG. 2. A light signal is transmitted from optical circuit board A as ray A2 into waveguide end or input port 117A, where it propagates along waveguide 117 to waveguide end 117B, and is received by optical circuit board B as ray B2. For simplicity the optical path of waveguide 117 follows a straight line. However, as depicted in FIG. 3, optical path 117 alternately runs in two different waveguide layers to enable other optical paths to cross it. As shown in FIG. 2, a second light signal is also transmitted from circuit board A as ray A2 into waveguide end 115A, where it propagates along waveguide 115 to waveguide end 115B, and is received by optical circuit board B as ray B2, and a third light signal is transmitted from optical circuit board B as ray B1 into waveguide end 113B, where it propagates along waveguide 113 to waveguide end 113A, and is received by optical circuit board A as ray A3.

Thus, in FIGS. 2 and 3, optical paths or waveguides 113, 115, and 117 include various straight sections in multiple waveguide layers in the optical backplane 110, pass-through structures that direct light from one layer to another, and turning elements that direct light to and from the input and output ports at the ends of their respective paths. In this manner, the optical paths may cross over or under each other, and light can be directed into and out of the backplane in a direction which is perpendicular to the backplane.

FIG. 3 shows exemplary optical backplane 110 having a top waveguide layer 301, comprising patterned core material 307a and cladding layer 309a, and a bottom waveguide layer 305 comprising patterned core material 307b and cladding layer 309b, separated by a middle cladding layer 303. Although two waveguide layers are shown for simplicity, more than two waveguide layers may be included in the flexible connector of the present invention. Two waveguide layers is the minimum needed to allow light paths to cross according to the present invention, and should be sufficient for most applications.

In the illustrated embodiment light passing in the longitudinal direction in optical backplane 110, i.e., in the direction between the waveguide ends, generally travels through bottom waveguide layer 305, except at the places where it is necessary to cross another optical path, and light passing in the optical backplane transverse to the longitudinal directions is generally travels through upper waveguide layer 301. Waveguide layers 301 and 305 each includes a waveguide core 307, a waveguide cladding 309, and angled sections 311. Angled sections 311 are preferably angled 45° relative to the optical backplane and have a metallic or other suitable coating to provide good light reflectance.

As an example, the optical path through waveguide 115 is as follows. Light from LED of optical circuit board A is focused by lens 302 on waveguide end 115A into the surface of optical backplane 110 and into waveguide end portion 313. A combination of straight and angled sections 311 route light along the waveguide in optical backplane 110. As necessary to cross another light path, light in one waveguide layer is redirected to the another waveguide layer. Thus, in FIG. 3, light is redirected from the bottom waveguide layer 305 by pass-through 315 through cladding layer 303 and redirected by another angled section 311 into the top waveguide layer 301. Preferably the pass-throughs are formed from the waveguide core material. After traveling the length of waveguide 115, the light is emitted into lens 302 on waveguide end 115B and focused onto PD of optical circuit board B. Waveguides 113 and 117 are formed in the same manner as waveguide 115. In one embodiment, the waveguides provide for routing signals in the direction between the optical circuit boards in one layer, and light in an orthogonal directions in another level.

While FIG. 3 depicts the use of angled surfaces to redirect light within the optical backplane of the present invention, in an alternative embodiment, the light is redirected by curved waveguides. Curved waveguides are used in the same general configuration as the lateral 45° mirrors shown in FIG. 2 for redirecting the light by 90°, or any other selected angle. Instead of abruptly turning the light by using an angled, reflective surface, the waveguide can be continuously curved to point perpendicular to the original propagation direction. More generally, by using a desired curvature, the propagation direction of light in the waveguide can be redirected by any angle relative to the original propagation direction. Those skilled in the art will appreciate that there is a limit to the radius of curvature of a curved waveguide which is a function of the indices of refraction of the core and cladding materials at the operating light wavelength. Thus, the radius of the waveguide curvature depends on the waveguide refractive indexes, waveguide dimensions, light wavelength etc. A preferable waveguide radius of curvature is from 1 to 10 mm. However it can be smaller and larger depending on the above parameters.

Figure 4A:
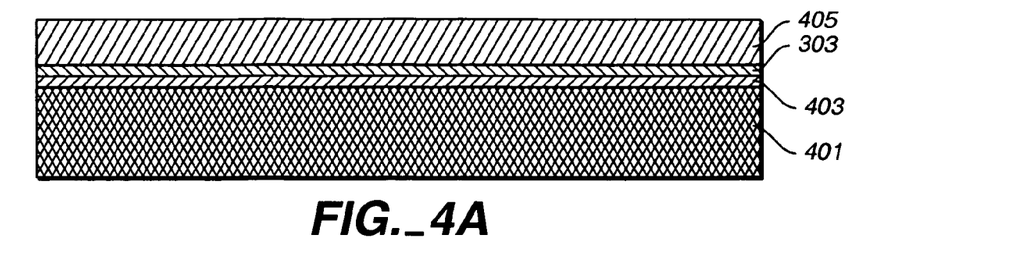
FIGS. 4A-4H illustrate a method for manufacturing an optical interconnect of the present invention.

A sequence of steps associated with one method of manufacturing a flexible optical connector of the present invention is illustrated in FIGS. 4A-4H. FIG. 4A shows a sacrificial layer 403, a first cladding layer 303, and a bottom waveguide core material 405 sequentially deposited on a temporary substrate 401. Temporary substrate 401 may be any suitable substrate material, such as silicon, ceramic, glass, or plastic.

The waveguide structures, specifically the cores, claddings and pass-throughs (which may also be referred to as "optical vias"), are preferably formed from flexible optical materials having sufficient strength to allow for the manufacturing processes described subsequently. Preferred waveguide core and cladding materials include optical polymers such as optical polyimides (OPI), optical epoxy resins, and other optical polymers. Appropriate optical polymers are well-known in the art, and need not be described in detail. Optical polymers in general and OPI films in specific can be used to form highly transparent waveguides that are directly or indirectly patterned using well-known photolithographic techniques. Optical polymers are preferred because they are flexible, relatively rugged, inexpensive and generally easy to work with. Generally, optical polymers are deposited by applying a uniformly thick liquid layer and then hardening it by curing, such as by the application of heat or UV radiation. The techniques for depositing and curing optical polymeric layers are well known and need not be described in detail.

First cladding layer 303 is preferably about 5 to about 50 μm thick. Core material 405 has a refractive index suitably higher than that of the cladding and is preferably about 5 to about 100 μm thick. Sacrificial layer 403 may be any suitable material, such as a metal, such as copper or tungsten, or an oxide, such as silicon dioxide, that can facilitate the separation of substrate 401 from the resulting waveguide structure.

Figure 4B:
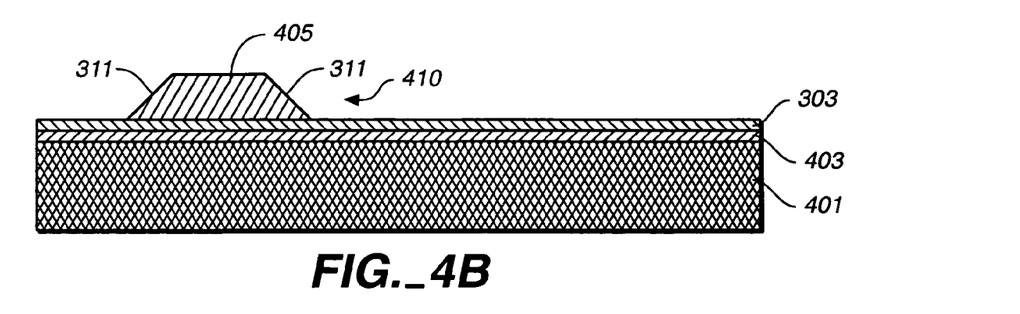

FIG. 4B shows the formation of a first patterned core structure 410 from bottom waveguide core material 405 by photolithography of the core layer and etching to define the shapes of the optical waveguide. As previously described, the waveguide may have a planar surface 407 and angled sections 311. Angled sections 311 can be formed, for example, by laser ablation, gray scale masking, dicing using an angled blade, and may be coated with a very thin reflective film, such as gold, silver or aluminum, to form reflective surfaces, preferably at an angle of 45°. Any suitable metal deposition technique, such as sputtering, evaporation, MOCVD or the like, may be used to form the reflective coatings.

Figure 4C:
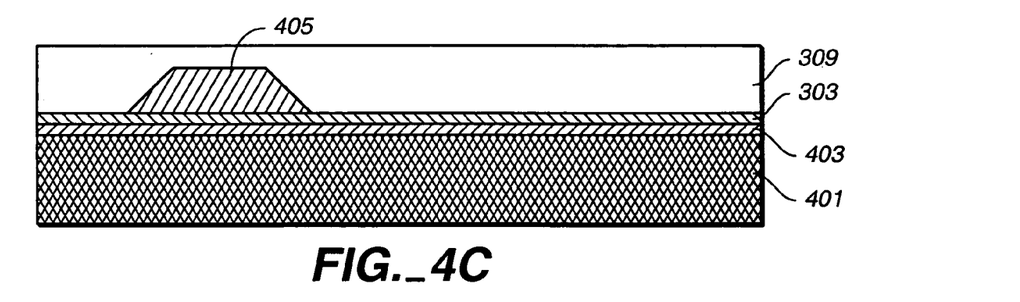

As shown in FIG. 4C, the next step is the deposition of second cladding 309 on first core pattern 410. It will be observed that in the exposed areas, i.e., those areas where the core material 405 has been removed, the second cladding 309 is deposited directly on the first cladding 303. As depicted, the upper surface of second cladding layer 309 is preferably planar such that the combination of second cladding layer 309 and core pattern 410 is substantially uniformly thick.

Figure 4D:
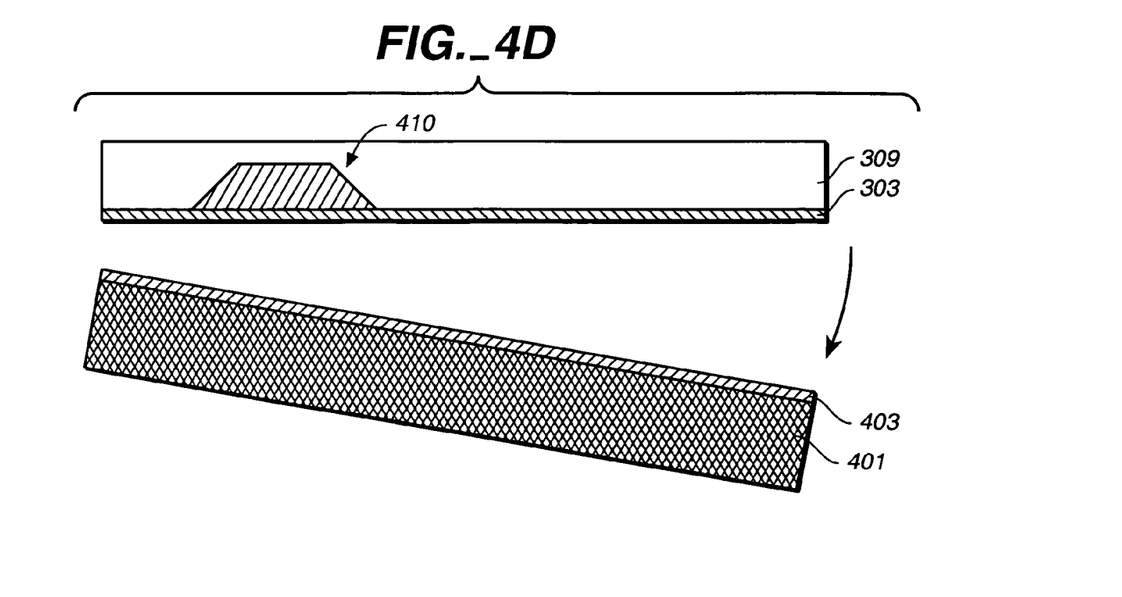

Next, as shown in FIG. 4D, second cladding 309 and core 410, which make up first waveguide layer 305, and first cladding layer 303 are separated from substrate 301. Separation is facilitated by sacrificial layer 403, which may be selected to allow chemical etching or easy peeling.

Figure 4E:
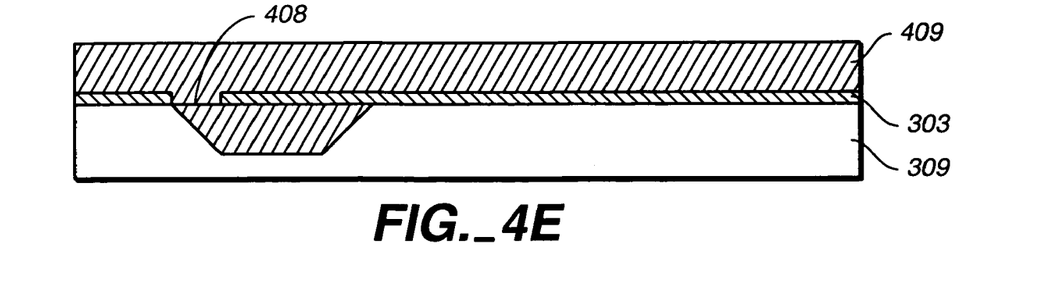

As shown in FIG. 4E, after the substrate and sacrificial layers have been removed, the remaining structure is flipped over and an opening 408 is formed in cladding layer 303 to allow fabrication of an optical pass-through between waveguide layers. Thereafter, a second waveguide core material 409 is deposited over cladding layer 303 and opening 408. Waveguide core material is preferably from about 5 to about 100 μm thick.

Figure 4F:
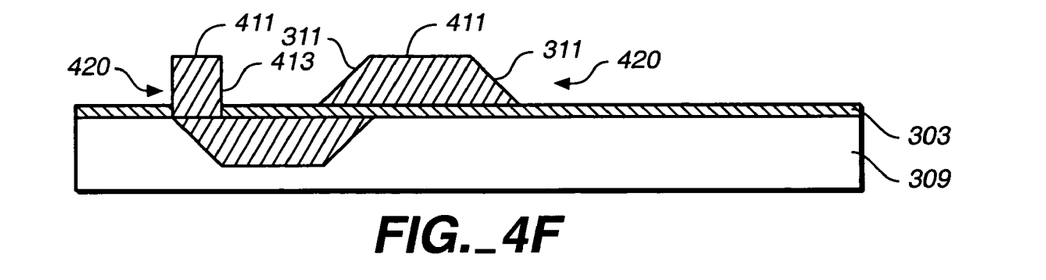

FIG. 4F shows the formation of a second patterned core 420 from top waveguide core material 409. In the example depicted in FIGS. 4F-4H, the second patterned core has a first section which runs parallel to the cross-sectional plane and a second section which runs perpendicular to the cross-sectional plane. These structure may be fabricated in the same manner previously described in connection with FIG. 4B, e.g., using photolithography, etc.

Figure 4G:
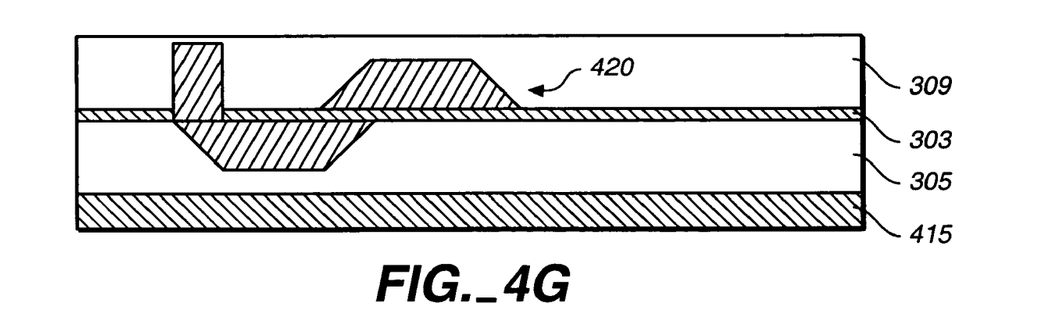

As shown in FIG. 4G, top waveguide layer 301 is then formed by the deposition of cladding 309 on second patterned core 420, and a flexible support 415 is added to bottom waveguide layer 305. Flexible support 415 may be formed of any suitable material, such as a flexible KAPTON® film or any other non-optical polyimide film having suitable properties, such as durability, strength, low cost, etc. Flexible support 415 may be grown or deposited onto the waveguide structure, or may be separately formed and attached using an adhesive layer.

Figure 4H:
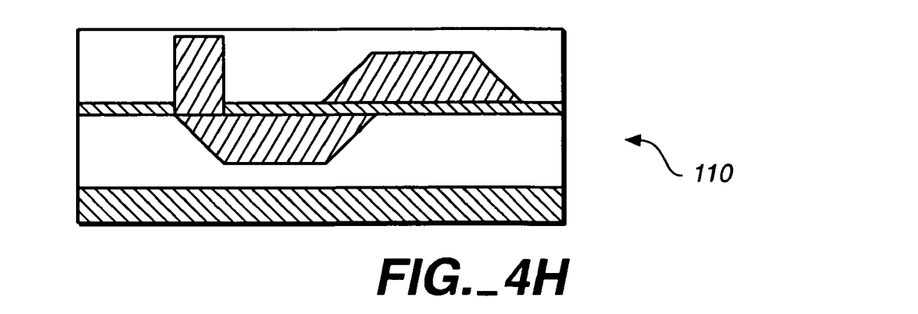

Lastly, as shown in FIG. 4H, the waveguide structures may be diced and polished, if necessary, to form optical backplane 110. Preferably, the overall thickness of the flexible connector of the present invention is from 50 to 2,000 μm.

Figure 5A:
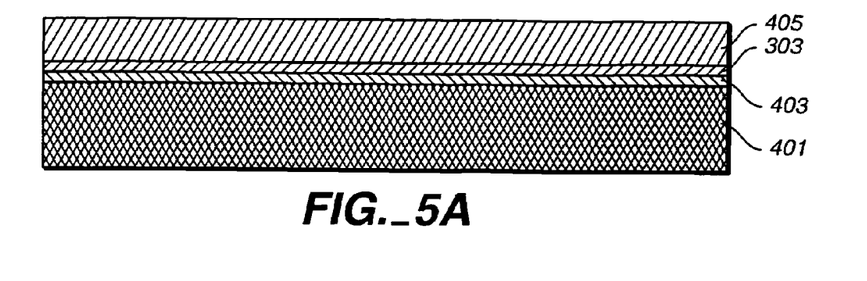
FIGS. 5A-5G illustrate an alternative method for manufacturing an optical interconnect of the present invention.

An alternative method of manufacturing a flexible connector suitable for use in optical backplane 110 is now described. First a bottom waveguide layer 305 and cladding layer 303 are formed as illustrated and as discussed in reference to FIGS. 4A-4D. Next, a similar process is used to separately form the top waveguide layer. Specifically, as shown in FIG. 5A, sacrificial layer 403, cladding layer 303, and top waveguide core material 405 are sequentially deposited on a substrate 401, and the core material is patterned.

Figure 5B:
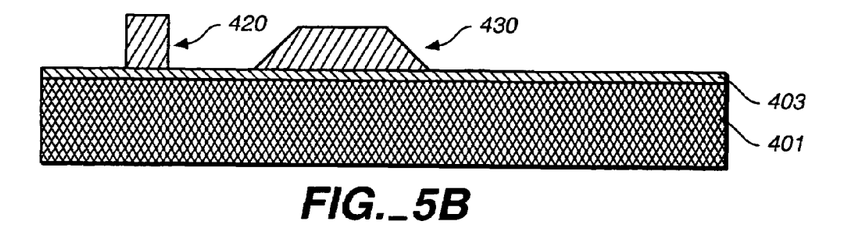
Figure 5C:
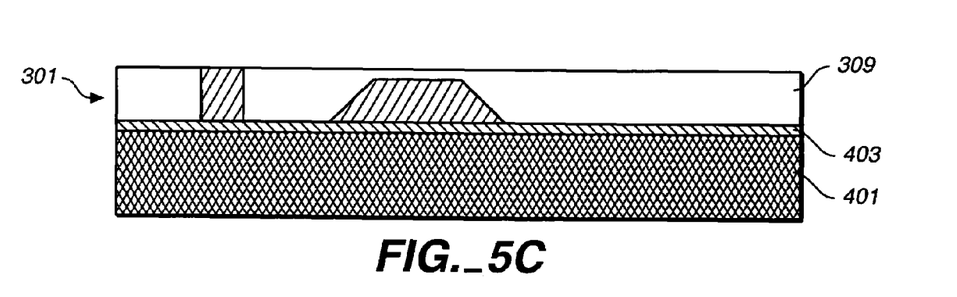
Figure 5D:
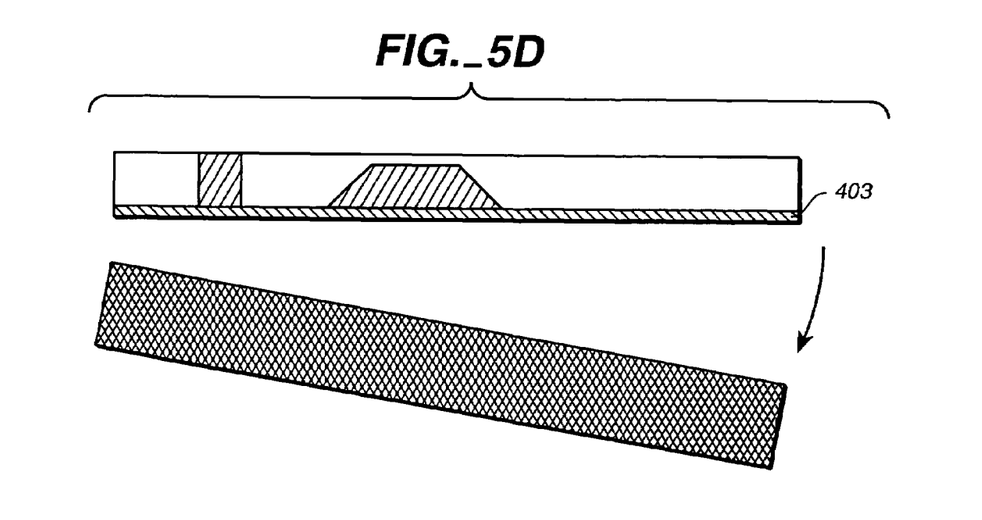
Figure 5E:
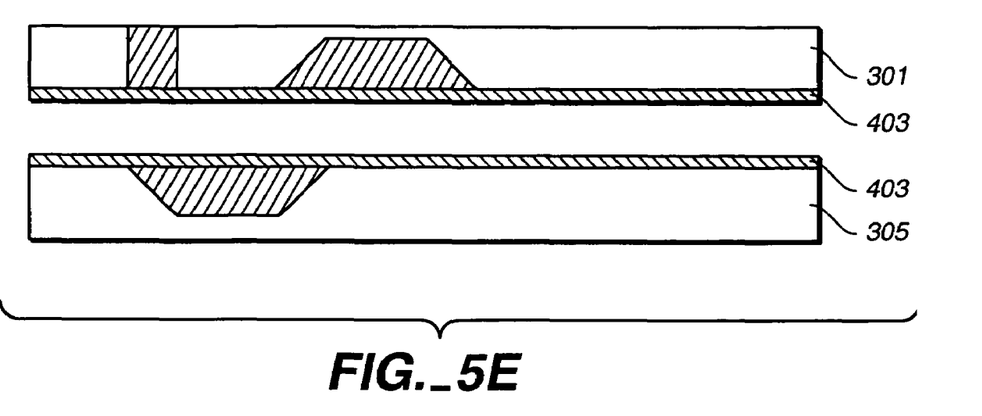
Figure 5F:
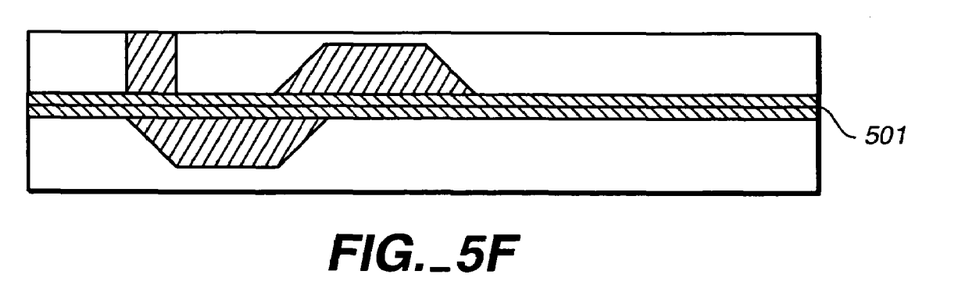

FIGS. 5B-5D, which are similar to the steps of FIGS. 4E-4F depict the steps used to form a top waveguide layer 301 on a cladding layer 303. As shown in FIG. 5E, the bottom waveguide layer 305 of FIG. 4D and top waveguide layer 301 of FIG. 5D are aligned with facing cladding layers 303 and joined together. Any suitable means for joining the two layers may be used, for example, an adhesive 501 may be applied between cladding layers 303 to fix the positions of the aligned top waveguide layer 301 and bottom waveguide layer 305.

Figure 5G:
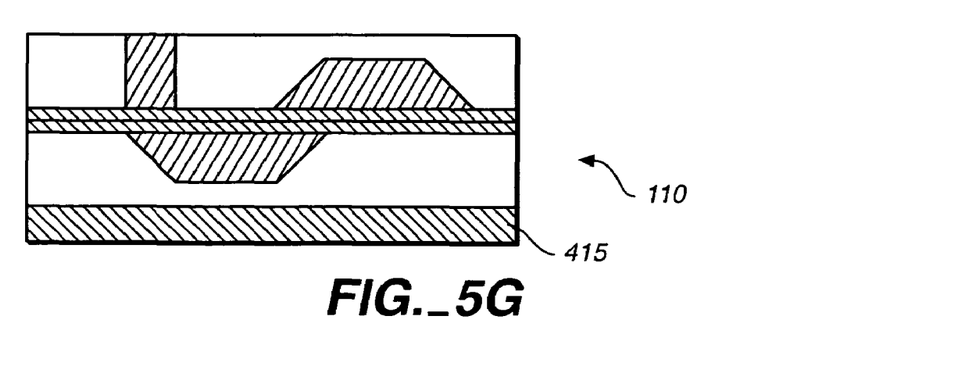

Thereafter, as shown in FIG. 5G, the resulting structure may diced and polished, if necessary, and a flexible support 415 is added to bottom waveguide layer 305 to form optical backplane 110.

Figure 6A:
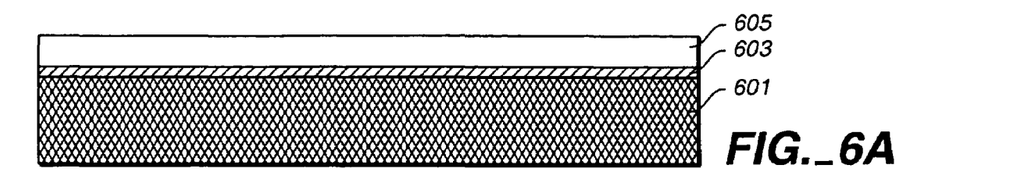
FIGS. 6A-6F illustrate another alternative embodiment for manufacturing an optical interconnect of the present invention.
Figure 6B:
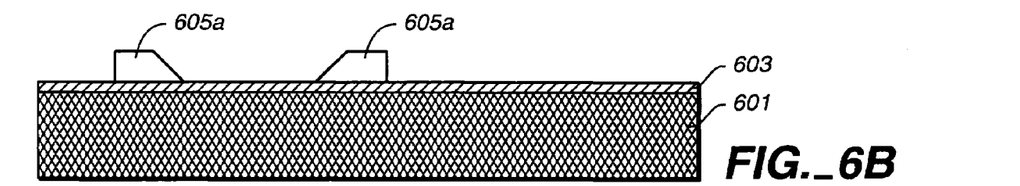

FIGS. 6A-6F illustrate yet another process for manufacturing the flexible optical interconnect of the present invention. FIG. 6A shows a substrate 601 of any suitable material. In one embodiment, substrate 601 is a flexible polyimide film. Depending on the design and use of the optical interconnect, it may be desirable to use a temporary substrate, as in the previously described embodiments, in which case an optional sacrificial layer (not shown in FIG. 6) may be formed between substrate 601 and lower or first cladding layer 603. A "wedge" layer 605 is then deposited on lower cladding layer 603 and patterned, as described above, to create structures 605a having a plurality of angled surfaces as show in FIG. 6B. Preferably, the angled surfaces are formed in pairs (one such pair is shown in FIGS. 6B-6F) with the members of each pair being in an opposing relationship. The angled surfaces are preferably coated with a reflective material, as previously described and are preferably at an angle of 45° to the plane defined by substrate 601.

Figure 6C:
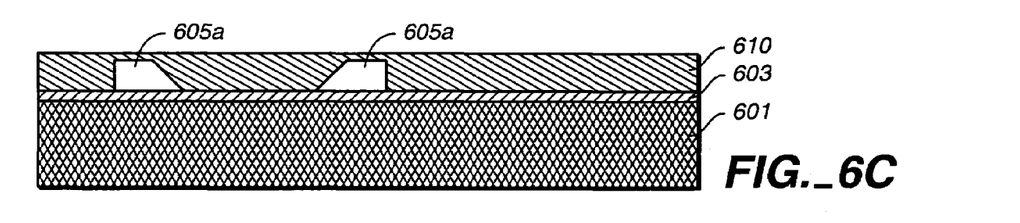
Figure 6D:
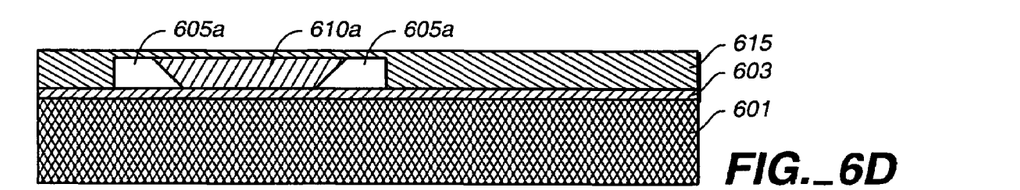
Figure 6E:
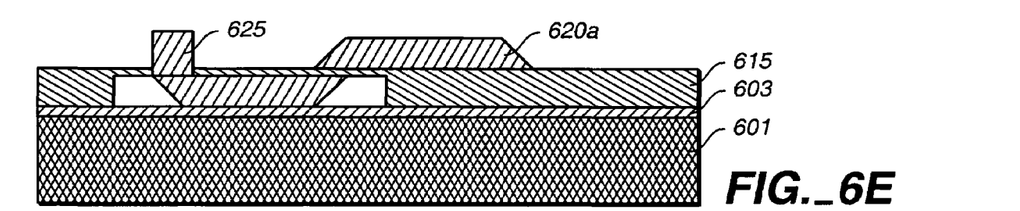
Figure 6F:
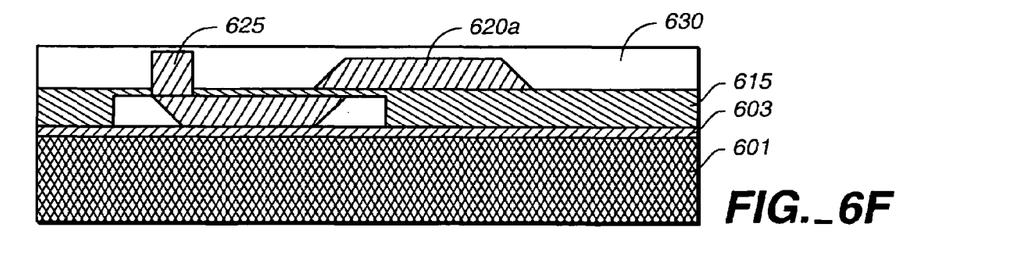

As shown in FIG. 6C a first core layer 610 is then deposited over the patterned wedge layer 605. Core layer 610 is preferably an optical polymer having good planarization properties. The "tops" of "wedge" structures 605a are, preferably, kept as small as practical to facilitate planarization of first core layer 610. As depicted in FIG. 6D, a first patterned core layer 610a is formed within the area defined by wedge structures 605a. A second cladding layer 615 is formed over the entire structure and planarized. A second core layer is then formed over top cladding 615, and is patterned to form second core structure 620 and a vertical optical via 625, as shown in FIG. 6E. Second core structure 620 includes complementary angled surfaces, as depicted, having a reflective film deposited thereon. An upper or third cladding layer 630 is then deposited over the upper surface of the resulting structure, and is planarized to provide a flat surface leaving the upper end of vertical optical via 625 exposed, as shown in FIG. 6F. Additional layers may be added using any of the techniques described herein, or multiple structures of the kind depicted in FIG. 6F may be joined together. Likewise, substrate 601 may be removed and a different or additional flexible backing material may be added.

In operation, as will be appreciated by those skilled in the art, the angled surfaces of the first and second core layers redirect light between the layer, thereby enabling complex routing of light signals through the flexible optical interconnect. Specifically, this arrangement allows light paths to cross over each other, so that light can be directed through the optical interconnect in two directions. Preferably, light in one layer travels in one direction in an arbitrary x-y plane defined by the substrate, while light in the second layer travels in the orthogonal direction.

Many alternative embodiments are within the scope of the present invention, including, for example, optical backplane waveguides may have ends near only one of the connectors to provide optical communication off of the optical backplane, and waveguides that include beam splitters to allow an optical signal to communicate with more than one received optical circuit board.

We claim:

1. An optical backplane adapted to accept a plurality of optical circuit boards and optically connect one or more optically active areas of said optical circuit boards, comprising:
   a substrate;
      a mounting structure for retaining and positioning the optical circuit boards on said substrate;
      an optical interconnect structure having a plurality of waveguides formed in a plurality of waveguide layers, each waveguide having a pair of waveguide ends defining a light path therebetween for communicating light signals between said optical circuit boards; and
   at least one of the waveguides comprising a continuous waveguide core disposed in and passing between two or more of the waveguide layers; and
      Wherein the continuous waveguide core comprises at least one pass-through for redirecting light between waveguide layers, wherein said pass-through comprises a complementary pair of angled reflective surfaces.

2. The optical backplane of claim 1, wherein at least two of said waveguide paths cross.

3. The optical backplane of claim 2, wherein said optical interconnect structure comprises a flexible strip mounted on said substrate.

4. The optical backplane of claim 3, wherein said flexible strip comprises a plurality of waveguide layers and said at least one pass-through redirects light traveling in one of said waveguide layers to another of said waveguide layers.

5. The optical backplane of claim 3, wherein said flexible strip has a thickness of from about 50 to about 1000 µm.

6. The optical backplane of claim 1, wherein said mounting structure comprises a plurality of bracket pairs.

* * * * *